(12) United States Patent
Bucci

(10) Patent No.: US 9,557,763 B2
(45) Date of Patent: Jan. 31, 2017

(54) ELECTRONIC CIRCUIT AND METHOD FOR PROVIDING A CLOCK SIGNAL

(71) Applicant: Infineon Technologies AG, Neubiberg (DE)

(72) Inventor: Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 283 days.

(21) Appl. No.: 14/159,533

(22) Filed: Jan. 21, 2014

(65) Prior Publication Data
US 2015/0205322 A1 Jul. 23, 2015

(51) Int. Cl.
*G06F 1/04* (2006.01)
*H03K 3/00* (2006.01)
*G06F 1/32* (2006.01)

(52) U.S. Cl.
CPC .............. *G06F 1/04* (2013.01); *G06F 1/324* (2013.01); *G06F 1/3296* (2013.01)

(58) Field of Classification Search
CPC .............................................. G06F 1/04–1/14
USPC ................................... 327/291–305
See application file for complete search history.

(56) References Cited

U.S. PATENT DOCUMENTS

| 6,933,754 | B2 | 8/2005 | Restle |
| 2009/0296490 | A1* | 12/2009 | Kwak ................ G11C 16/30 365/185.23 |

* cited by examiner

*Primary Examiner* — Lincoln Donovan
*Assistant Examiner* — Metasebia Retebo
(74) *Attorney, Agent, or Firm* — Viering, Jentschura & Partner mbB

(57) ABSTRACT

According to an embodiment, an electronic circuit is described comprising a processing circuit, a power supply configured to supply power to the processing circuit via two supply nodes; a determiner configured to determine whether the voltage between the two supply nodes is above a predetermined reference voltage; and a clock generator configured to generate a clock signal for the processing circuit wherein the clock generator is configured to if the determiner determines that the voltage between the two supply nodes is again, after pausing the generation of clock edges, above the predetermined threshold the clock generator generates a clock edge irrespective of whether it is currently a time point given by the predetermined periodicity.

16 Claims, 17 Drawing Sheets

ELECTRONIC CIRCUIT AND METHOD FOR PROVIDING A CLOCK SIGNAL

TECHNICAL FIELD

The present disclosure relates to electronic circuits and methods for providing a clock signal.

BACKGROUND

In some applications, the power supply current of an electronic circuit which is available to operate a processing circuit (e.g. of a synchronous digital device) is variable and may be insufficient to operate the processing circuit at the maximal clock frequency that is supported by the electronic circuit. This issue may be addressed by controlling the clock generation for the processing circuit in order to prevent the power supply voltage to drop under a minimal allowed value. Approaches for an efficient clock regulation that allows high performance with respect to the available current are desirable.

SUMMARY

An electronic circuit is provided including a processing circuit; a power supply configured to supply power to the processing circuit via two supply nodes; a determiner configured to determine whether the voltage between the two supply nodes is above a predetermined reference voltage; and a clock generator configured to generate a clock signal for the processing circuit wherein the clock generator is configured to
- if the determiner determines that the voltage between the two supply nodes is above a predetermined reference voltage, generate clock edges at time points given by a predetermined periodicity;
- if the determiner determines that the voltage between the two supply nodes is not above the predetermined reference voltage to pause the generation of clock edges; and
- if the determiner determines that the voltage between the two supply nodes is again, after pausing the generation of clock edges, above the predetermined threshold the clock generator generates a clock edge irrespective of whether it is currently a time point given by the predetermined periodicity.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
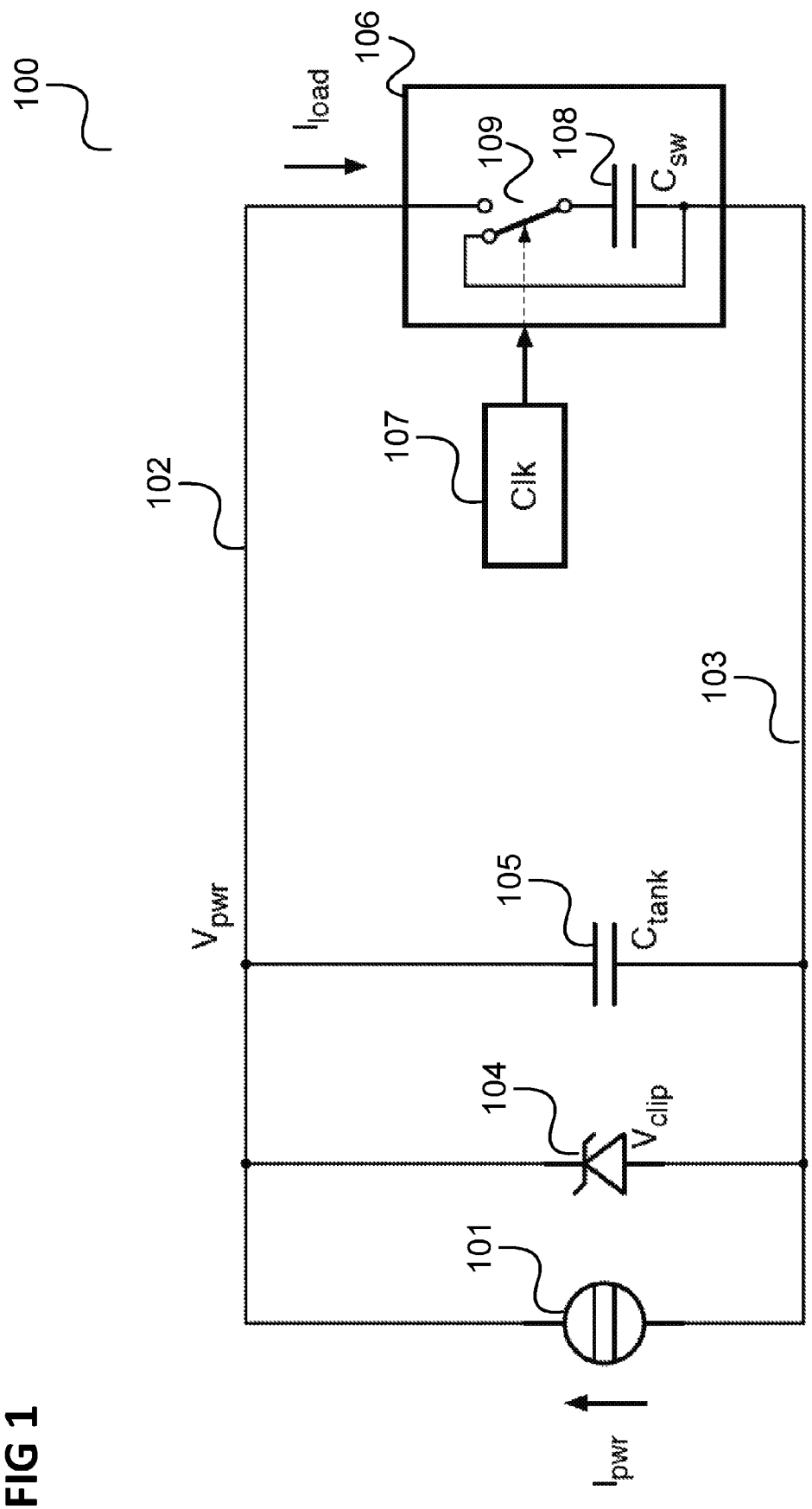
FIG. 1 shows an electronic circuit.

FIG. 1 shows an electronic circuit 100.

The electronic circuit 100 includes a current source 101 which is connected between a first node referred to as first power supply node 102 and a second node referred to as second power supply node 103.

A shunt 104 (e.g. a zener diode), a first capacitor 105 with capacity $C_{tank}$ and a processing circuit 106 are connected in parallel between the first power supply node 102 and the second power supply node 103.

The electronic circuit 100 further includes a clock generator 107 configured to supply a clock signal to the processing circuit 106.

The current source 101 supplying a current $I_{pwr}$, the first capacitor 104 and the shunt 104 which limits the voltage between the power supply nodes 102, 103 to a voltage clipping $V_{clip}$ can be seen as the power supply for the processing circuit 106.

The processing circuit 106 can be seen as the load of the electronic circuit 100. It is in this example, a synchronous digital device modeled as a second capacitor 108 with capacitance $C_{sw}$ which is connected and disconnected between the first power supply node 102 and the second power supply node 103 by a switch 109 controlled by the clock generator 107.

Each clock pulse delivered by the clock generator 107 to the processing circuit 106 (closing the switch 109 such that the second capacitor 108 is connected between the supply node 102,103) results in a charge redistribution between the first capacitor 105 and the second capacitor 108 and therefore in a voltage drop $\Delta V_{pwr}$ of the voltage $V_{pwr}$ between the power supply nodes 102. This is illustrated in FIG. 2.

Figure 2:
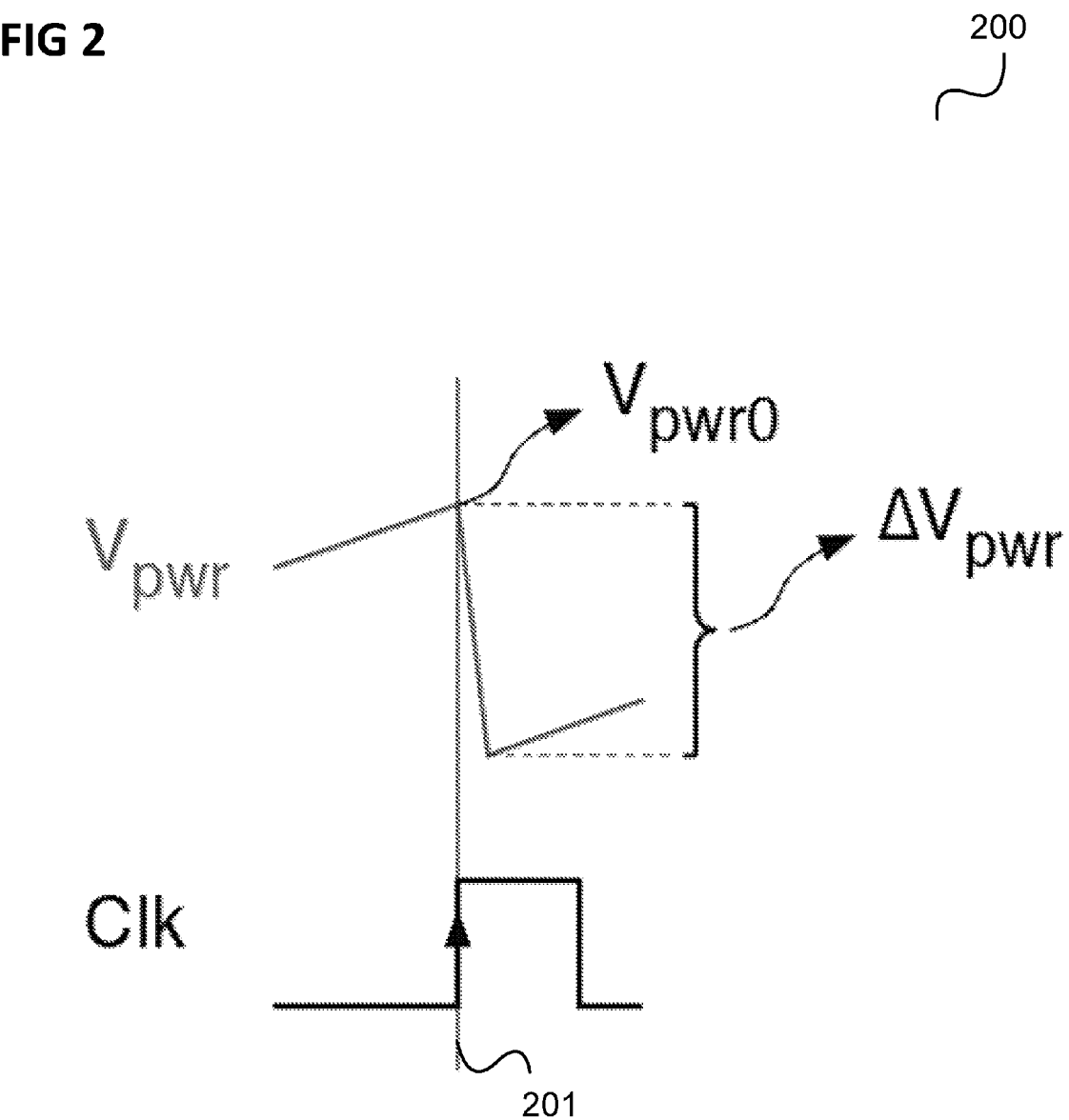
FIG. 2 shows a voltage/clock diagram which illustrates the behavior of a supply voltage of the electronic circuit of FIG. 1.

FIG. 2 shows a voltage/clock diagram 200 which illustrates the behavior of $V_{pwr}$ when there is a clock pulse that starts at a time 201.

As illustrated, the voltage $V_{pwr}$ drops by $\Delta V_{pwr}$ which is given by $$\Delta V_{pwr} = V_{pwr0} \frac{C_{SW}}{C_{tank} + C_{SW}}$$

where $V_{pwr0}$ is the voltage between the power supply nodes 102, 103 just before the clock edge.

Figure 3:
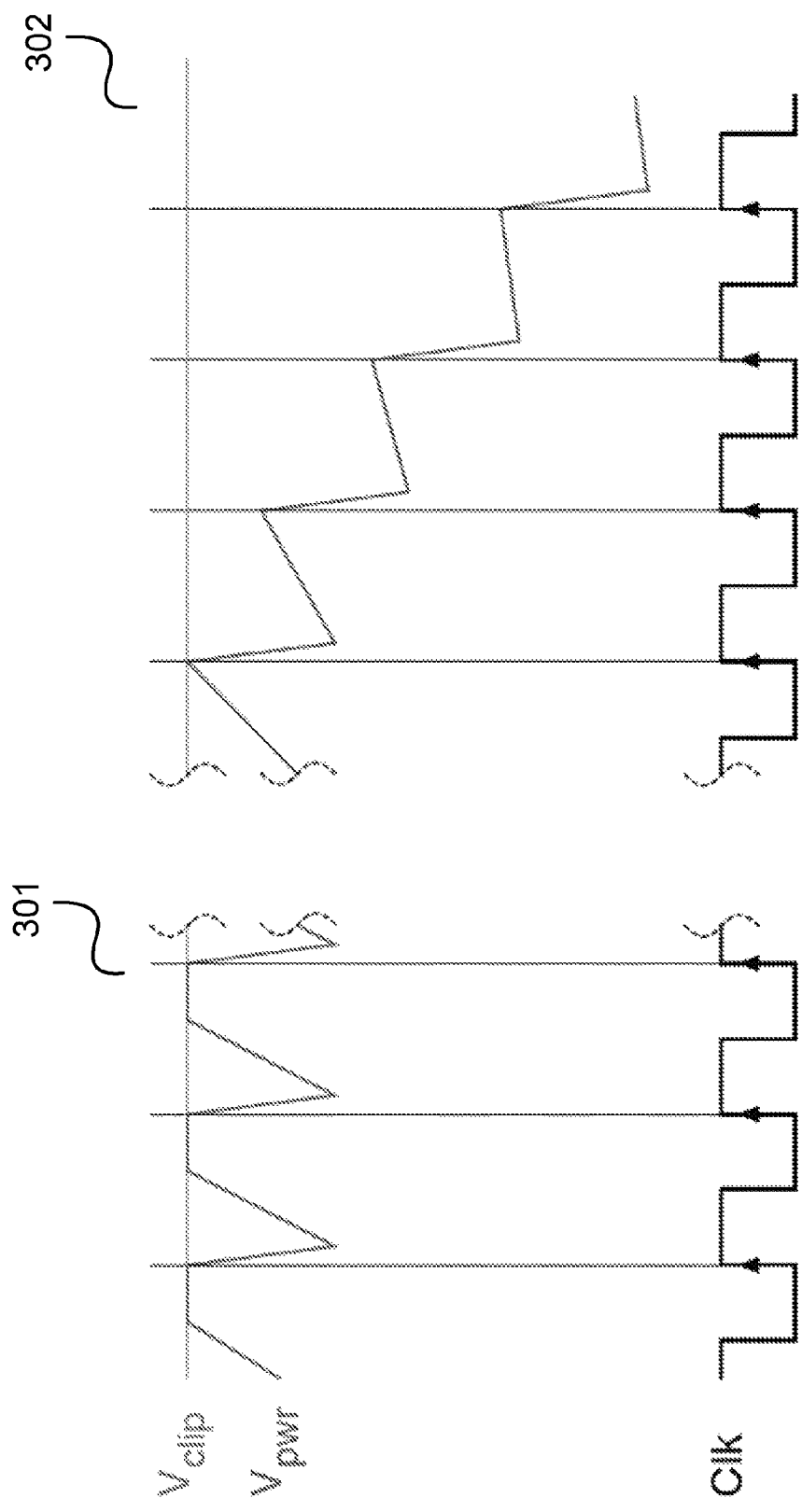
FIG. 3 shows a first voltage/clock diagram and a second voltage/clock diagram which illustrate examples for the behavior of a supply voltage of the electronic circuit of FIG. 1.

The behavior of the voltage $V_{pwr}$ over a longer period for two different cases is illustrated in FIG. 3.

FIG. 3 shows a first voltage/clock diagram 301 and a second voltage/clock diagram 302.

For both voltage/clock diagrams 301, 302 time increases from left to right.

The first voltage/clock diagram 301 illustrates the case that the current $I_{pwr}$ provided by the current supply 101 is sufficient to restore $V_{pwr}$ after one clock pulse until the next clock pulse (in this example to $V_{clip}$). In this case, the electronic circuit can operate at the maximal clock frequency (corresponding to the illustrated clock signal) absorbing a maximum average load current $I_{load\_max}$ and, in case $I_{pwr}$ is larger than $I_{load\_max}$, the surplus of power is absorbed by the voltage limitation provided by the shunt 104.

However, as illustrated in the first voltage/clock diagram 302, in case that $I_{pwr}$ is lower than $I_{load\_max}$, the load consumption needs to be reduced in order to prevent $V_{pwr}$ to drop below the minimum allowed value.

Figure 4:
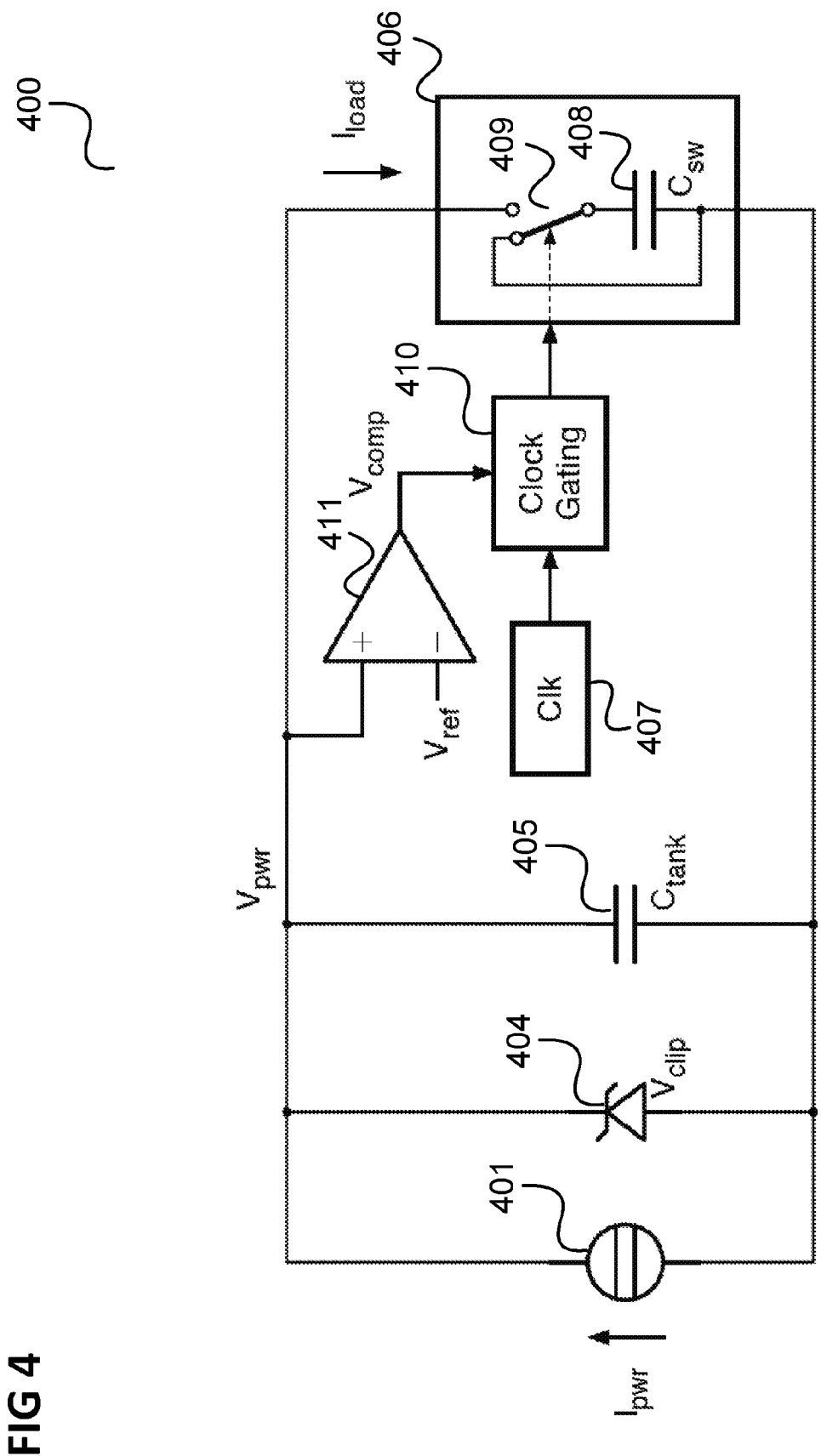
FIG. 4 shows an electronic circuit with a clock gating mechanism.

This can be achieved by a clock suppression mechanism as illustrated in FIG. 4.

FIG. 4 shows an electronic circuit 400.

Analogously to the electronic circuit 100, the electronic circuit 400 includes a current supply 401, a shunt 404, a first capacitor 405 and a processing circuit 406 modeled as a second capacitor 408 switched by a switch 409.

The electronic circuit 400 further includes a clock generator 407 which is in this example connected to the switch 409 via a clock gating circuit 410. The clock gating circuit 407 is controlled by a comparator 411 comparing the voltage $V_{pwr}$ with a reference voltage $V_{ref}$.

The clock gating circuit 410 suppresses the clock pulses provided by the clock 407 when $V_{pwr}$ falls below $V_{ref}$. However, the delay of this clock suppression may be rather large because the control loop that is formed by the clock gating circuit 410, the processing circuit 406 and the comparator 411 has an intrinsic granularity due to the fact that the clock pulses can be released only synchronously. An additional, and even larger, delay results from the fact that, in order to reduce the probability of metastability events, also the output of the comparator needs typically to be synchronized. Ultimately, at least a couple of clock pulses are needed after $V_{pwr}$ crosses $V_{ref}$ before the clock is activated or deactivated.

Figure 5:
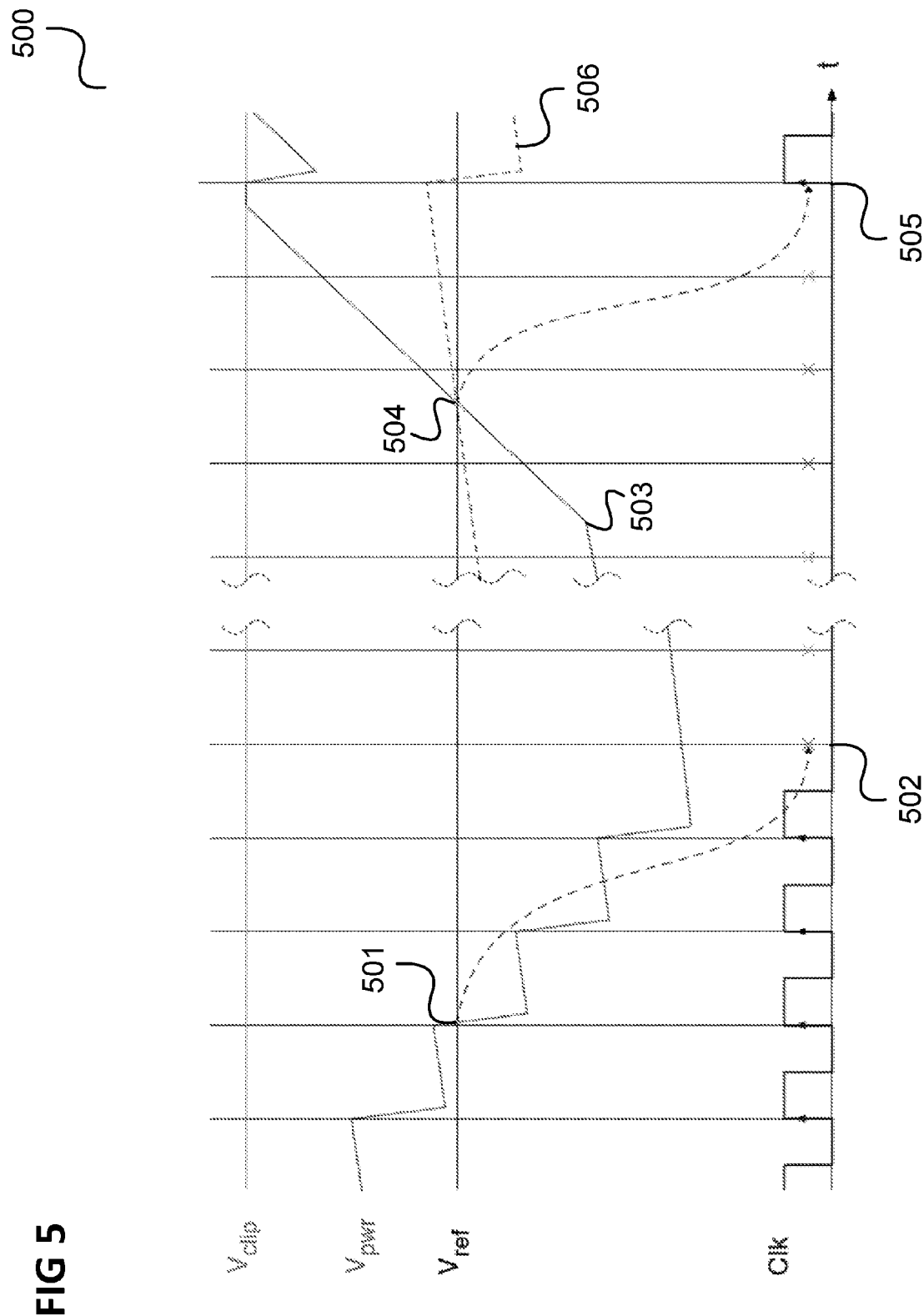
FIG. 5 shows a voltage/clock diagram illustrates the behavior of a supply voltage of the electronic circuit of FIG. 5.

An example of how the electronic circuit behaves when the supply current $I_{pwr}$ is below $I_{load\_max}$ and only later recovers is shown in FIG. 5.

FIG. 5 shows a voltage/clock diagram 500.

As in FIG. 3, time increases from left to right.

In this example, due to $I_{pwr}$ being lower than Iload_max at a first time 501, $V_{pwr}$ drops below $V_{ref}$. Only after a plurality of clock pulses, the clock gating circuit 410 starts to suppress clock pulses at a second time 502. It is assumed that at a third time 503, $I_{pwr}$ recovers and at a fourth time 504, $V_{pwr}$ is above $V_{ref}$ again. However, only after another plurality of clock pulses, the clock gating circuit 410 stops to suppress clock pulses at a fifth time 505.

It can be seen that, due to the delay on both clock deactivation (start of suppression) and clock activation (stop of suppression) the ripple of $V_{pwr}$ is quite large and largely extends both above and below $V_{ref}$.

It should be noted that even if $I_{pwr}$ is constant (as indicated by the dashed line 506 in FIG. 5), whenever the clock is activated and deactivated the resulting $V_{pwr}$ ripple has still a rather large amplitude. In fact, it can be seen that the variation of $V_{pwr}$ is not a consequence of the variation of $I_{pwr}$, but of the control loop instability which results from its intrinsic delay.

The ripple of $V_{pwr}$ could be reduced by increasing $C_{tank}$. However, because of cost constraints is typically desirable to minimize $C_{tank}$. The intrinsic precision of the clock control mechanism is crucial to obtain both a sufficient $V_{pwr}$ ripple limitation and a minimal $C_{tank}$ requirement.

It should further be noted that given a certain supply current, the maximal energetic efficiency of the load is obtained in case the clock period is constant and the power supply voltage is minimized (according to the clock period). On the contrary, even in case $I_{pwr}$ is constant, the regulation mechanism of FIG. 4 results in clock bursts and in a large $V_{pwr}$ ripple. Further, according to this mechanism, energy is expended to generate clock pulses that are suppressed afterwards. Namely, clock pulses are generated anyway at the maximal frequency even when if $I_{pwr}$ is too low to supply the load at this frequency. This results in a rather low efficiency when operating with low $I_{pwr}$.

Regarding the clipping voltage $V_{clip}$ it should be noted that this threshold should typically be set low enough to guarantee a required voltage protection but high enough to ensure that there is no current leakage when $V_{pwr} < V_{ref}$. However, these requirements are typically not easy to fulfill both because the $V_{clip}$ threshold can be quite smooth and because the activation of the shunt 104 can be rather slow compared to the $V_{pwr}$ variations.

In the approach illustrated in FIG. 4, power supply, load, and clock generation can be seen to be considered as separated elements and the clock suppression mechanism can be seen as an addition in order to prevent the power supply voltage to drop below a certain minimum level.

In the following, an electronic circuit is described in which these elements can be seen to be considered as the parts of single system, namely a power supply regulator.

Figure 6:
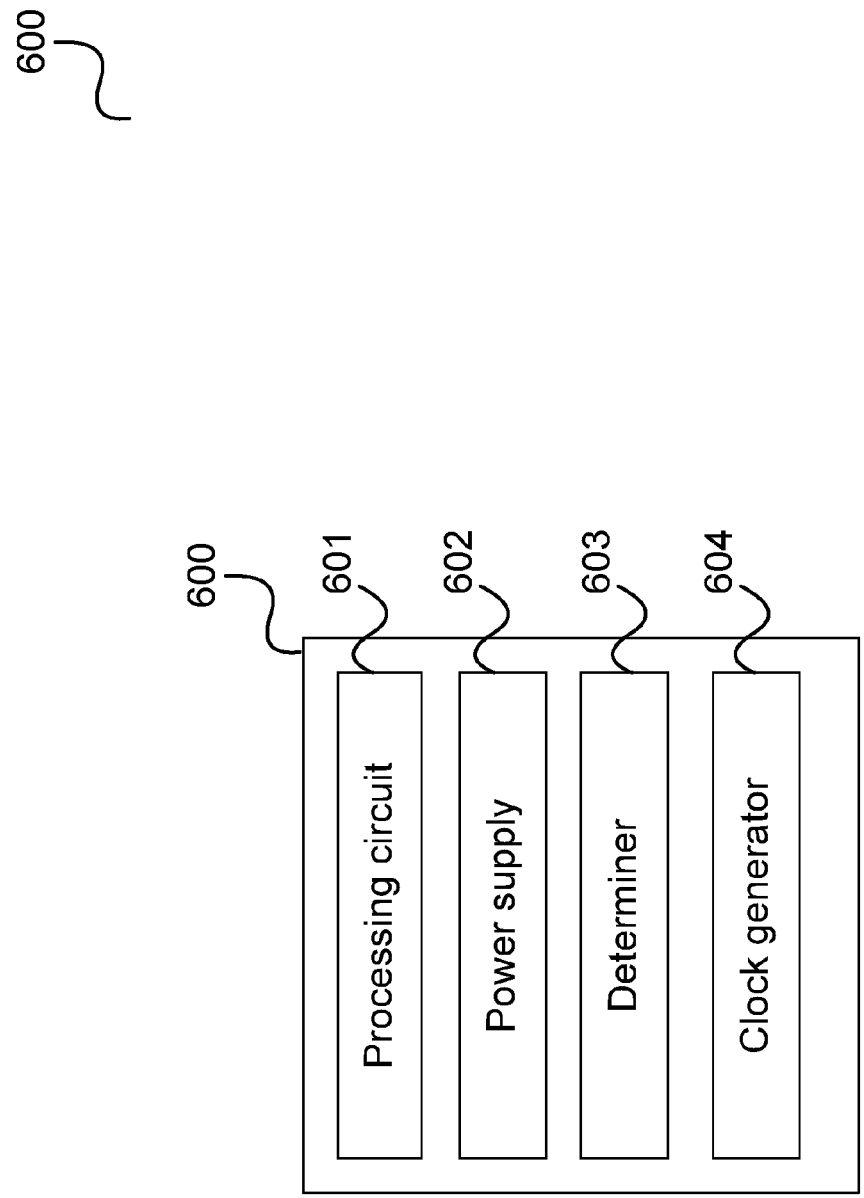
FIG. 6 shows an electronic circuit according to an embodiment.

FIG. 6 shows an electronic circuit 600 according to an embodiment.

The electronic circuit 600 includes a processing circuit 601 and a power supply 602 configured to supply power to the processing circuit 601 via two supply nodes.

The electronic circuit 600 further includes a determiner 603 configured to determine whether the voltage between the two supply nodes is above a predetermined reference voltage.

Further, the electronic circuit 600 includes a clock generator 604 configured to generate a clock signal for the processing circuit 601 wherein the clock generator 604 is configured to if the determiner determines that the voltage between the two supply nodes is above a predetermined reference voltage, generate clock edges at time points given by a predetermined periodicity;

if the determiner determines that the voltage between the two supply nodes is not above the predetermined reference voltage to pause the generation of clock edges; and if the determiner determines that the voltage between the two supply nodes is again, after pausing the generation of clock edges, above the predetermined threshold the clock generator generates a clock edge irrespective of whether it is currently a time point given by the predetermined periodicity.

In one embodiment, in other words, clock edges (or clock pulses) are generated in a flexible way without sticking to a fixed clock pattern (as it is for example the case when just gating clock pulses, since in this case each clock pulse that is not gated follows the clock pulse pattern of the clock). In other words, the time of a clock edge after recovery of the supply voltage (this means the voltage between the power supply nodes), i.e. after the supply voltage is again above the reference voltage is flexible with respect to the earlier clock pattern, e.g. lies between the timings of clock pulses according to the periodicity of the clock signal before the pausing of the clock.

In other words, if the determiner determines that the voltage between the two supply nodes is again, after pausing the generation of clock edges, above the predetermined threshold the clock generator generates a clock edge independent from the time points given by the predetermined periodicity.

In other words, if the determiner determines that the voltage between the two supply nodes is again, after pausing the generation of clock edges, above the predetermined threshold the clock generator generates a clock edge without waiting for the next time point given by the predetermined periodicity.

In other words, if the determiner determines that the voltage between the two supply nodes is again, after pausing the generation of clock edges, above the predetermined threshold between two of the time points given by the predetermined periodicity, it generates at least one clock edge between the two time points.

In other words, if the voltage between the two supply nodes falls below the predetermined reference voltage the clock generator generates a clock edge between two time points given by the predetermined periodicity if it is determined that at this point of time the voltage between the two supply nodes is above the predetermined reference voltage.

According to various embodiments, as for example described further below, the power supply regulation for a load and the clock generation for the load can be seen to be integrated. Clock generation can be seen as a result of the power supply regulation and the regulation element is the load itself (e.g. a synchronous device) which operates as a switched shunt. Additionally, a switched serial regulation can be integrated in the same mechanism. The clock generation according to various embodiments may be seen to result in a mechanism that dynamically adjusts and optimizes the performances of the load depending on the available power supply current.

According to one embodiment, the clock generator is configured to generate further clock edges after the generated clock edge according to the predetermined periodicity.

The electronic circuit may further include a switch configured to connect the power supply to the processing circuit if the voltage between the two supply nodes is below the reference voltage.

The electronic circuit may further include a switch configured to disconnect the power supply from the processing circuit if the voltage between the two supply nodes is above the reference voltage and no clock edge is to be generated according to the predetermined periodicity.

The predetermined periodicity is for example given by a predetermined minimum time between two clock edges.

For example, the clock generator is configured to generate the clock edge if at least the predetermined minimum time since the last clock edge has passed.

The processing circuit is for example a digital processing circuit.

According to one embodiment, the electronic circuit further includes a shunt connected between the two supply nodes configured to limit the voltage between the two supply nodes to a predetermined clipping voltage.

According to one embodiment, the electronic circuit further includes a comparator configured to compare the voltage between the supply nodes with the reference voltage and to provide a comparison signal indicating the result of the comparison at an output of the comparator.

For example, the clock generator includes a storage element storing the current clock state and having a control input connected to the output of the comparator.

The control input is for example connected to the output of the comparator such that the comparison signal may trigger (e.g. if another condition is fulfilled such as the time since the last clock edge being above a minimum time) a state transition of the storage element.

The storage element is for example configured to provide the current clock state at an output and the generated clock signal is the signal as provided at the output.

The storage element is for example a Flip Flop.

For example, the storage element is a Set-Reset-Flip Flop.

The power supply is for example a current source.

Figure 7:
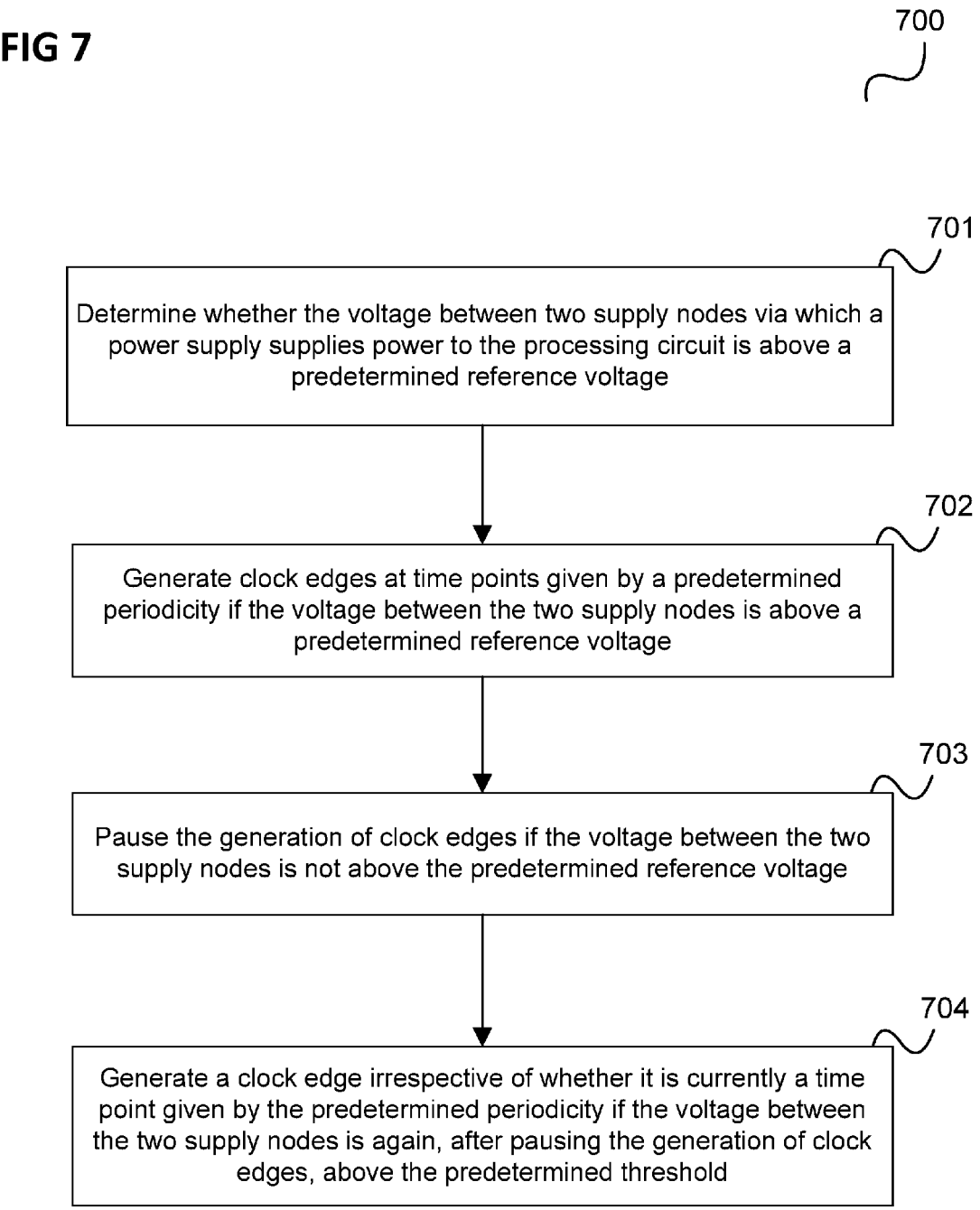
FIG. 7 shows a flow diagram illustrating a method for providing a clock signal.

The electronic circuit 600 for example carries out a method as illustrated in FIG. 7.

FIG. 7 shows a flow diagram 700

The flow diagram 700 illustrates a method for providing a clock signal to a processing circuit.

In 701, it is determined whether the voltage between two supply nodes via which a power supply supplies power to the processing circuit is above a predetermined reference voltage.

In 702, clock edges are generated at time points given by a predetermined periodicity if the voltage between the two supply nodes is above a predetermined reference voltage.

In 703, the generation of clock edges is paused if the voltage between the two supply nodes is not above the predetermined reference voltage.

In 704 a clock edge is generated irrespective of whether it is currently a time point given by the predetermined periodicity if the voltage between the two supply nodes is again, after pausing the generation of clock edges, above the predetermined threshold.

It should be noted that embodiments described in context of the electronic circuit 600 are analogously valid for the method illustrated in FIG. 6 and vice versa.

In the following, embodiments are described in more detail.

Figure 8:
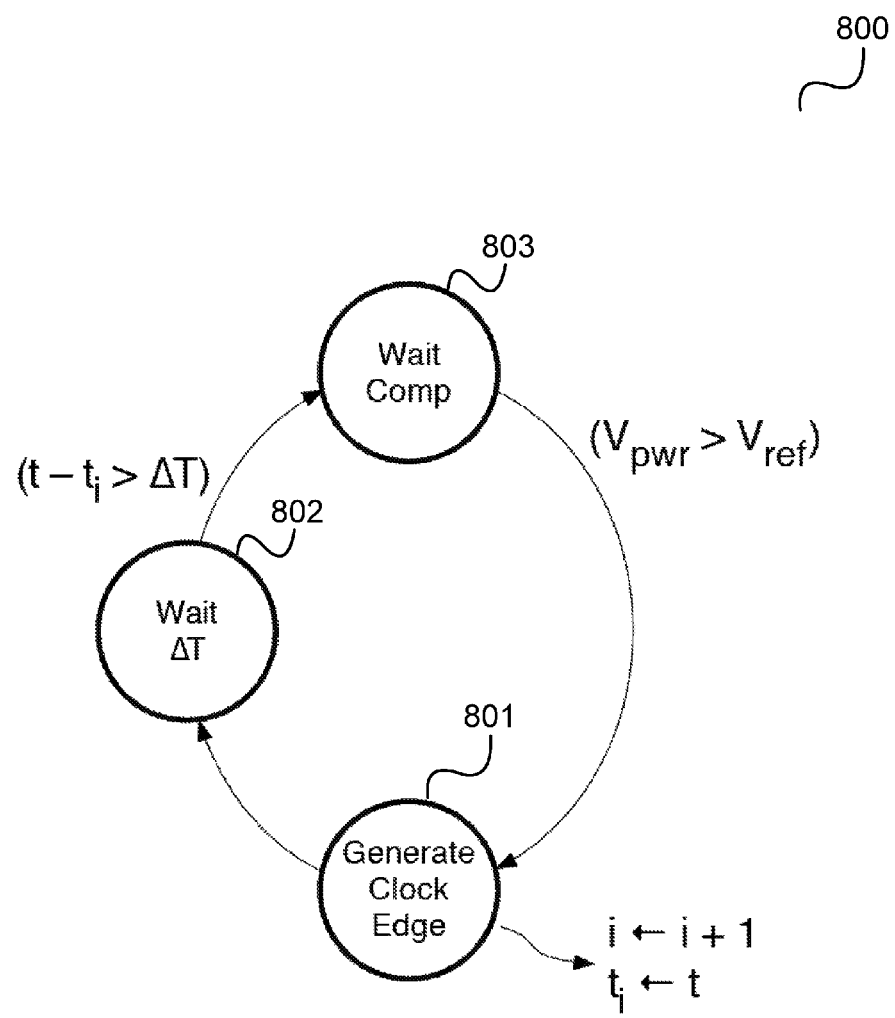
FIG. 8 shows a state diagram.

According to one embodiment, corresponding to the view of considering clock generation as part of power supply regulation clock pulses are generated as a result of power supply regulation (or clock control) mechanism which operates according a finite-state machine (FSM) state diagram as illustrated in FIG. 8.

FIG. 8 shows a state diagram 800.

The state diagram 800 includes a first state 801 in which the ith clock edge is generated. The time of generating the ith clock edge is denoted as $t_i$.

After the first state 801, a second state is entered in which the power regulation/clock generation mechanism waits for a time ΔT. When the difference between the current time t and the time $t_i$ is higher than ΔT, a third state 803 is entered in which it is checked whether $V_{pwr}$ is above $V_{ref}$. If this is the case, the mechanism again enters the first state 801 to generate the next clock pulse (and i is increased by one).

According to the mechanism illustrated in FIG. 8, a clock edge is generated asynchronously when both the following conditions are fulfilled:
1. $V_{pwr}$ is higher than $V_{ref}$.
2. The minimal clock period ΔT from the previous clock edge has expired.

The first condition can be seen as the feedback of the regulation loop while the second condition realizes the limitation to prevent the clock from exceeding its maximum value when $I_{pwr}$ exceeds $I_{load\_max}$.

Figure 9:
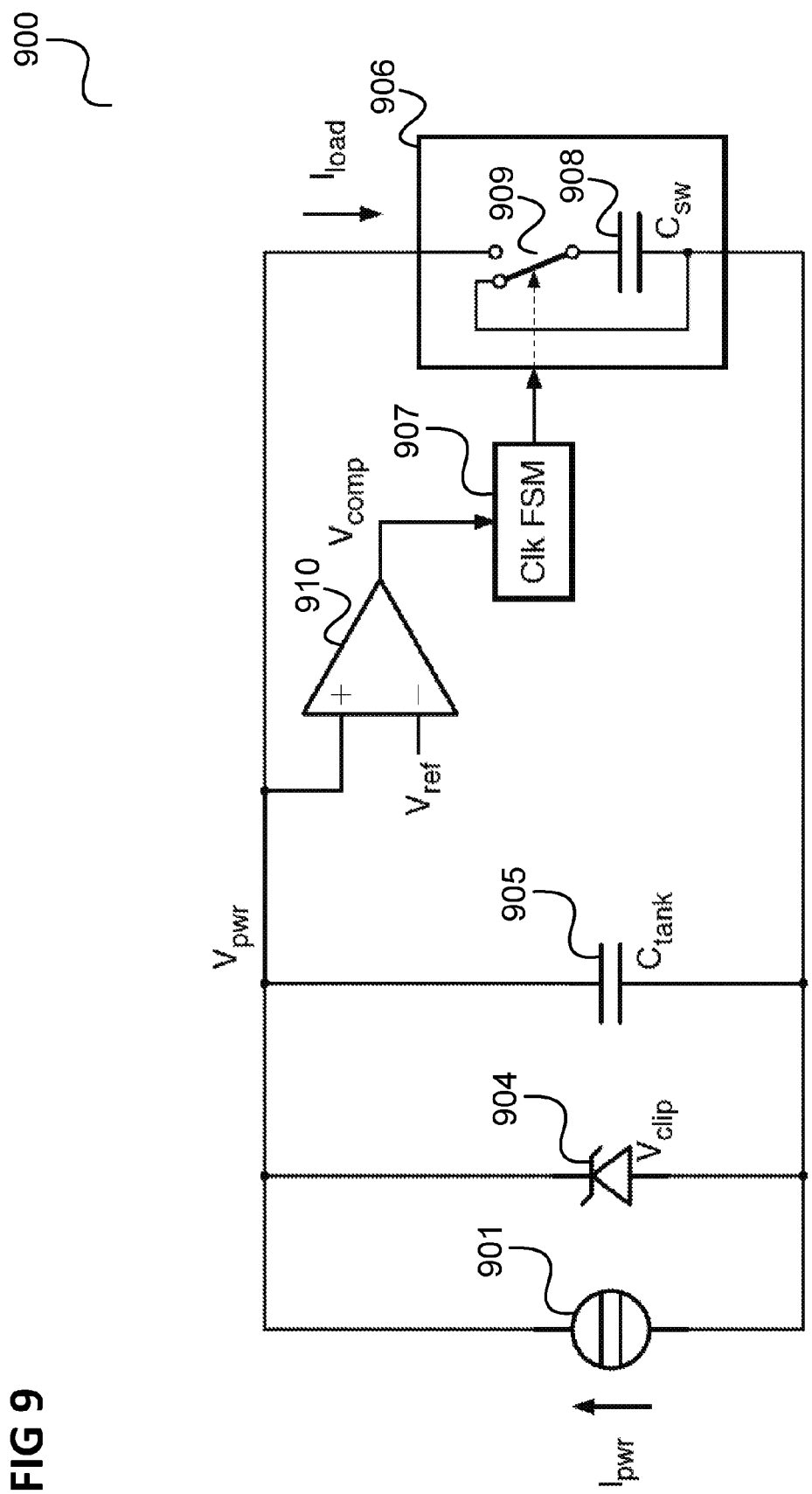
FIG. 9 shows an electronic circuit operating according to the state diagram of FIG. 8.

An example for an electronic circuit implementing the clock generation mechanism explained with reference to FIG. 8 is shown in FIG. 9.

FIG. 9 shows an electronic circuit 900.

Analogously to the electronic circuit 100, the electronic circuit 900 includes a current supply 901, a shunt 904, a first capacitor 905 and a processing circuit 906 modeled as a second capacitor 908 switched by a switch 909.

The electronic circuit 900 further includes a clock generator 907 which controls the switch 909 and which operates according to the state machine illustrated in FIG. 8. It receives the result of the comparison between $V_{pwr}$ and $V_{ref}$ from a comparator 910 comparing the voltage $V_{pwr}$ with reference voltage $V_{ref}$.

Figure 10:
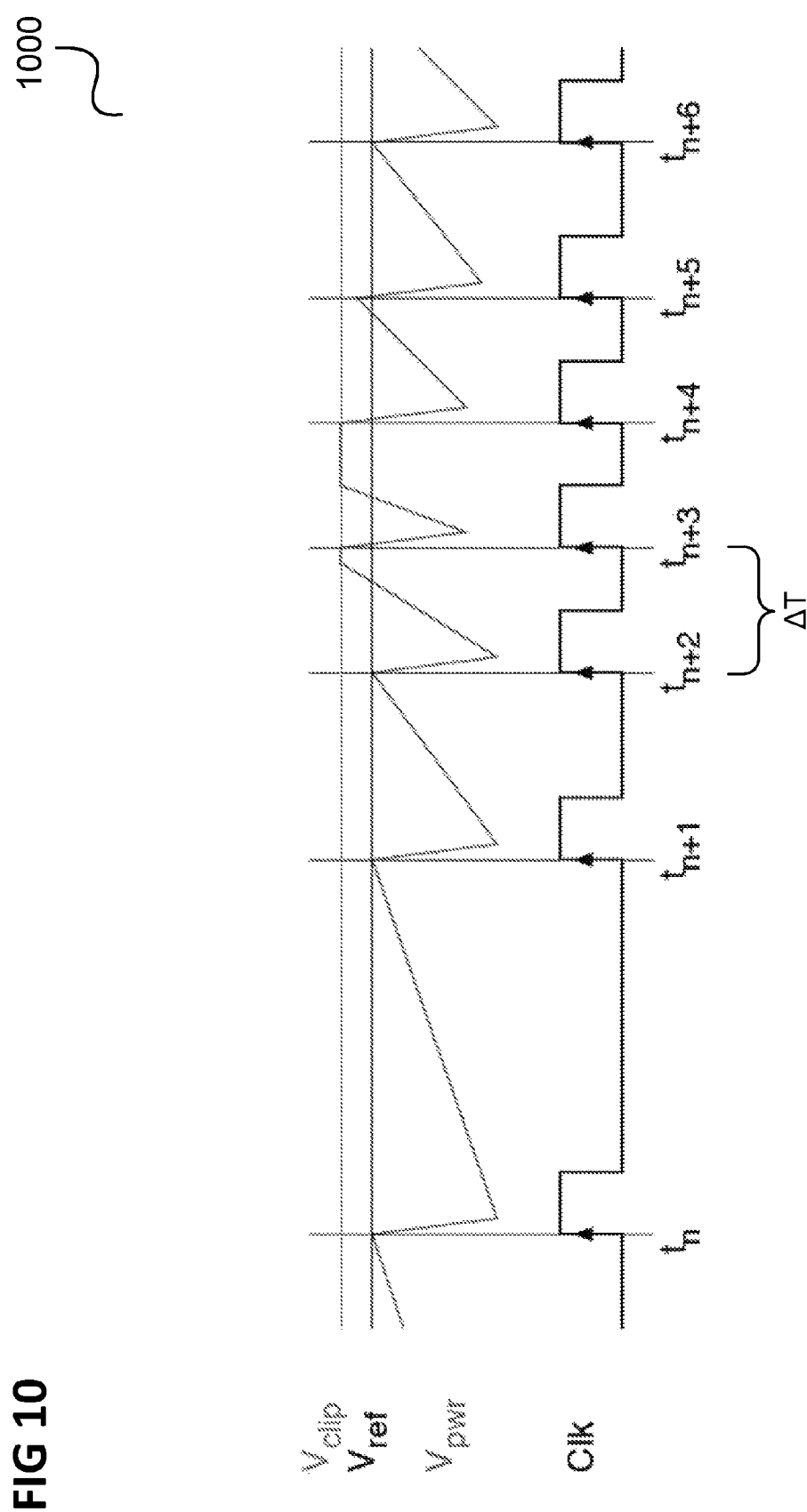
FIG. 10 shows a voltage/clock diagram which illustrates the behavior of a supply voltage of the electronic circuit of FIG. 9.

The behavior of $V_{pwr}$ resulting from the power regulation/clock generation mechanism is illustrated in FIG. 10.

FIG. 10 shows a voltage/clock diagram 1000.

Time increases from left to right in the voltage/clock diagram 1000.

As can be seen clock edges 1001 are generated if $V_{pwr}$ is higher than $V_{ref}$ and if at least the time ΔT has expired since the last clock edge.

It can be seen that apart from the difference ($V_{clip}-V_{ref}$), the $V_{pwr}$ ripple is limited to $\Delta V_{pwr}$ (see FIG. 2). Additionally, the clock period is smoothly adapted to $I_{pwr}$ instead of clock bursts being generated. This allows operating the load 906 with a better energetic efficiency and also with less risk of errors or damages due to too low or too high $V_{pwr}$ values.

Further, compared to the electronic circuit 400, the clock generator 407 and the related power consumption are removed. Namely, when the clock is stopped, i.e. no clock pulses are generated, there switching activity and therefore dynamic power consumption of the clock generation are avoided.

In case the power supply is suspended, the electronic circuit 900 automatically freezes (i.e. no clocks a generated) and can survive, i.e. the internal status of the processing circuit 906 may be held until the static power consumption of the processing circuit 906 makes $V_{pwr}$ drop below the minimal value that allows the processing circuit 906 to retain its internal status. This means that the operation of the electronic circuit 900 can be extended to very low values of $I_{pwr}$.

Regarding implementation, it should be noted that according to the approach illustrated in FIG. 8, metastability issues resulting from the resynchronization of the regulation loop with clock generation can be avoided. In fact, according to this approach the regulation loop and the clock generation can be seen to be the same, i.e. to be integrated in the same functionality.

For simplicity, only the power consumption occurring at the active edge (i.e. the rising edge) of the clock has been considered with reference to FIG. 8. The approach of FIG. 8 can be analogously extended to both clock edges. Examples for implementations for both cases (active edge only and both edges) are given below.

Figure 11:
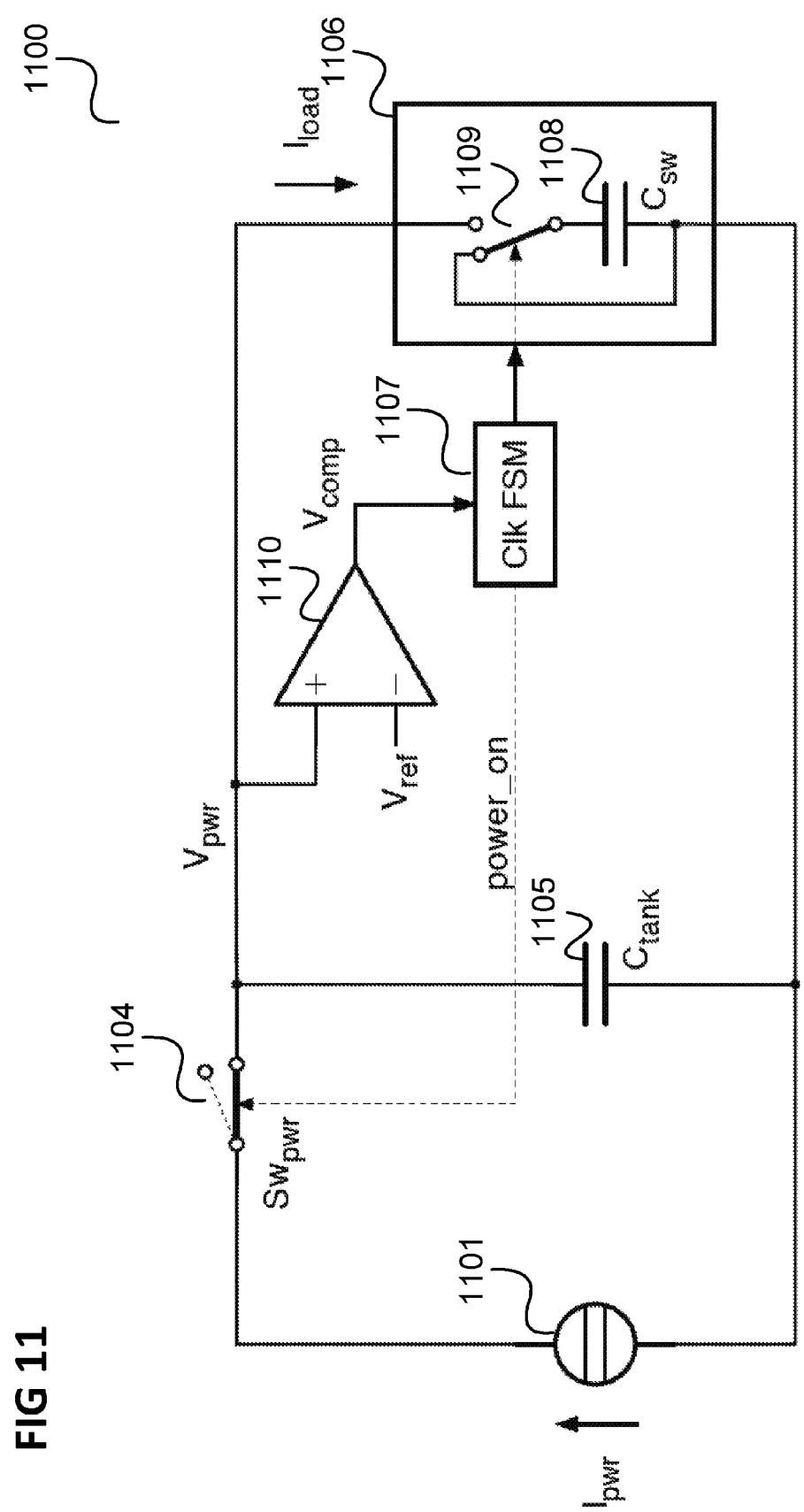
FIG. 11 shows an electronic circuit having a power supply switch.

An extension of the electronic circuit 900 with regard to an integration of a power voltage limitation mechanism (corresponding to the limitation to $V_{clip}$ by the shunt 904 in the electronic circuit 900) in the regulation loop is illustrated in FIG. 11.

FIG. 11 shows an electronic circuit 1100.

Analogously to the electronic circuit 900, the electronic circuit 1100 includes a current supply 1101, a first capacitor 1105, a processing circuit 1106 modeled as a second capacitor 1108 switched by a switch 1109, a comparator 1110 and a clock generator 1107 which controls the switch 1109 and which operates according to the state machine illustrated in FIG. 8.

The electronic circuit 1100 further includes a power supply switch 1104.

Figure 12:
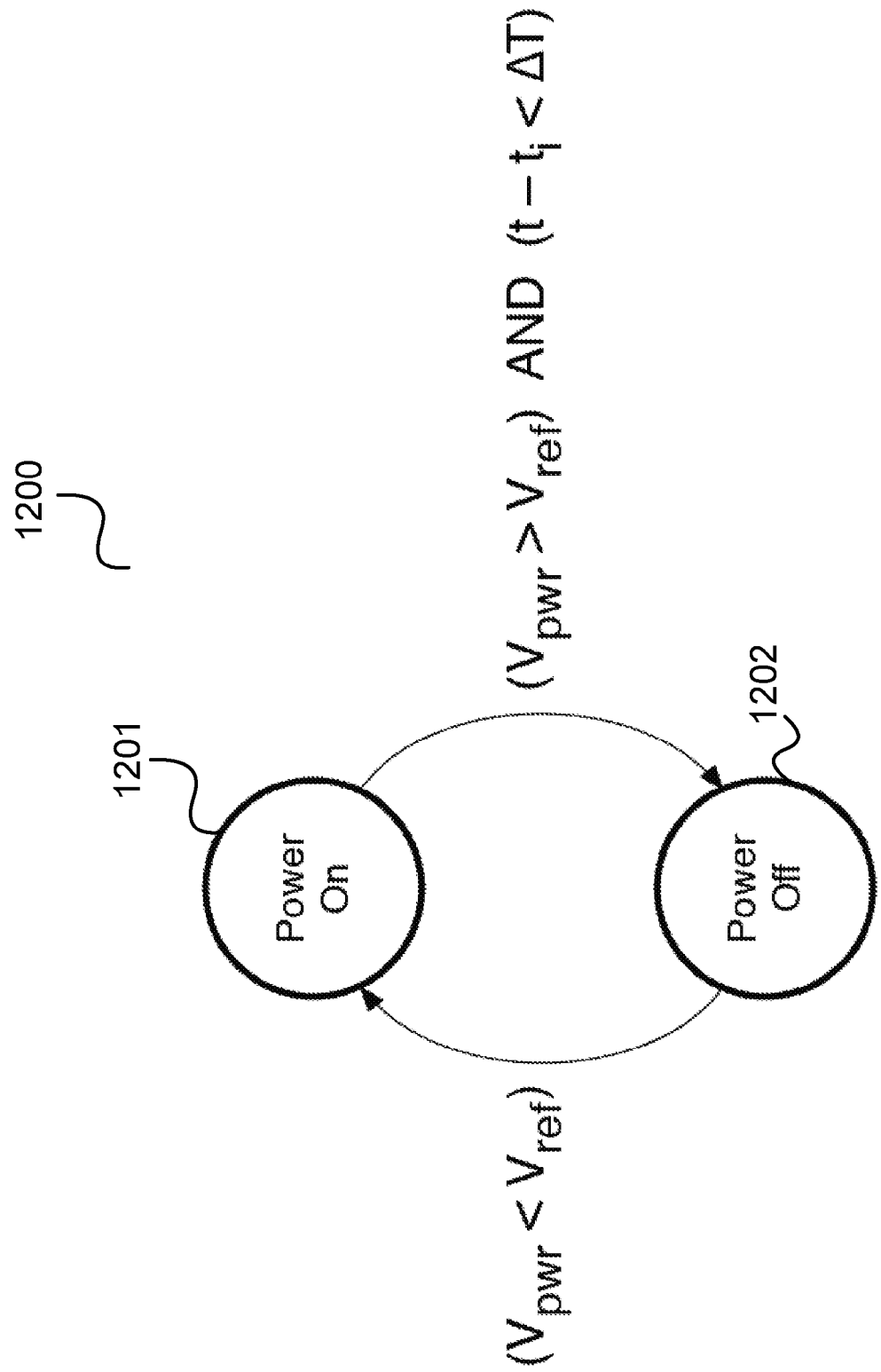
FIG. 12 shows a state diagram for the electronic circuit of FIG. 11.

The power supply switch 1104 is switched on and off by a power_on signal which is generated by the clock generator 1107 according to the state diagram illustrated in FIG. 12.

FIG. 12 shows a state diagram 1200.

The state diagram 1200 includes a first state 1201 in which the power supply is switched on, i.e. power supply switch 1104 is closed, and a second state 1202 in which the power supply is switched off, i.e. power supply switch 1104 is open.

There is a state transition from the first state 1201 to the second state 1202 if $V_{pwr}$ is above $V_{ref}$ and the difference between the current time t and the time $t_i$ is below ΔT (wherein $t_i$ and ΔT are as described above with reference to FIG. 8).

Further, there is a state transition from the second state 1202 to the first state 1201 if $V_{pwr}$ is below $V_{ref}$.

Basically, the current supply 1101 is disconnected from the load 1106 whenever $V_{pwr}$ reaches $V_{ref}$ before a new clock pulse can be generated.

Due to this sequential mechanism, no power switching, and therefore no power loss, occurs when operating with limited $I_{pwr}$ which would not be the case if the power supply switching would be driven directly by the comparator 1110 (i.e. short power off/on glitches would be generated).

It should be noted that in case a large current is controlled, a power supply switch may present a large capacitance on the input control. Consequently, its activation/deactivation may require considerable energy.

The power supply is reactivated (i.e. the current supply 1101 is reconnected) when $V_{pwr}$ drops below $V_{ref}$. However, depending on the design constraints, also different reactivation mechanisms can be used. For example, the power supply could be reactivated on the clock edge, provided that the comparator is disabled till when the $V_{pwr}$ reduction resulting from the clock edge itself is propagated back to the comparator input.

Figure 13:
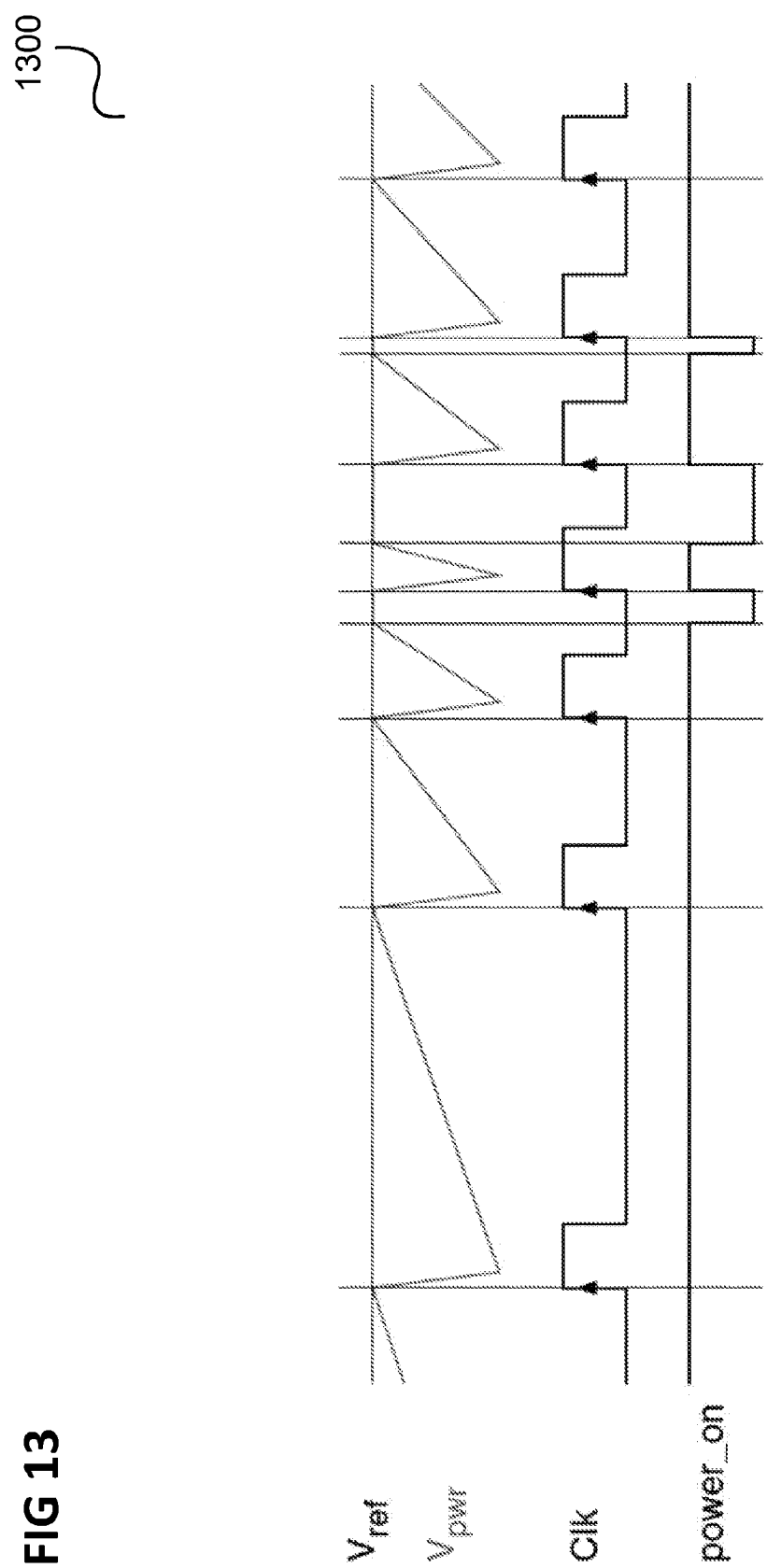
FIG. 13 shows a voltage/clock diagram which illustrates the behavior of a supply voltage of the electronic circuit of FIG. 11.

An example for a resulting behavior of $V_{pwr}$ from the power supply regulation of the electronic circuit 1100 is shown in FIG. 13.

FIG. 13 shows a voltage/clock diagram 1300.

Time increases from left to right in the voltage/clock diagram 1000.

In addition to $V_{pwr}$ and the clock signal, the signal power_on as provided by the clock generator 1107 to the power supply switch 1104 is shown.

It should be noted that, in principle, $V_{ref}$ and $V_{clip}$ are coincident and therefore there a relative adjustment between these two reference voltages can be omitted.

The analog regulation loop arising implicitly by clipping to $V_{clip}$ is eliminated in the electronic circuit 1100. In case of a large current to be regulated and a required high regulation speed, such a loop may be quite difficult to be implemented. The comparator 1110 can be seen to remain the only analog element of the system while the Vpwr regulation is implemented only by switching elements.

In the following, examples for possible implementations of the clock generator 907, 1107 are given.

Figure 14:
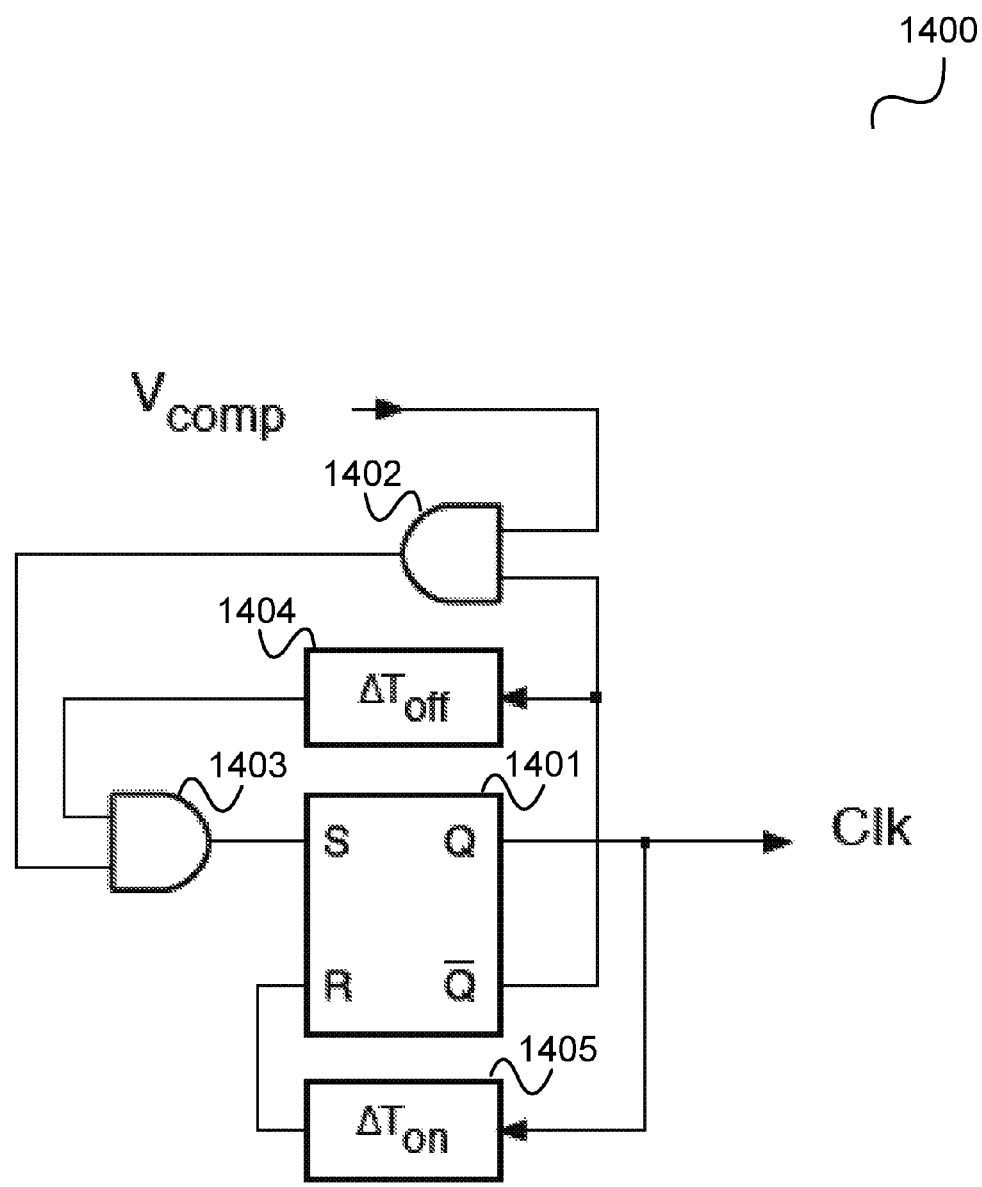
FIG. 14 shows an example of an implementation of a clock generation circuit.

FIG. 14 shows a clock generation circuit 1400.

The clock generation circuit 1400 can for example be used as the clock generator 907.

The clock generation circuit 1400 includes an Set-Reset-Flip Flop (SR FF or RS FF for Reset-Set-Flip Flop) 1401 and a first AND gate 1402 which receives the signal $V_{comp}$ and the $\overline{Q}$ output signal of the SR FF 1401 as inputs. The output signal of the first AND gate 1402 is fed to an input of a second AND gate 1403 along with the output of a first delay element 1404 which delays the $\overline{Q}$ output signal of the SR FF 1401 by a clock off time $\Delta T_{off}$. The output of the second AND gate 1403 is fed to the S input of the SR FF 1401.

The Q output of the SR FF 1401 is the generated clock signal. It is further fed to a second delay element 1405 which delays the Q output of the SR FF 1401 by a clock on time $\Delta T_{on}$ and feeds it to the R input of the SR FF 1401.

The clock generation circuit 1400 implements an SR FF oscillator where the feedback to the S input of the SR FF 1401 is enabled only when $V_{pwr} > V_{ref}$. As a result, while the on-time of the clock period is fixed by $\Delta T_{on}$, the off-time can vary between $\Delta T_{off}$ and infinite, depending on when $V_{pwr}$ becomes larger than $V_{ref}$. Hence the clock generation circuit 1400 behaves as illustrated by state diagram 800.

In the clock generation circuit 1400 only the active clock edge is controlled and no signal for a serial power supply regulation (e.g. the signal power_on of the electronic circuit 1100) is implemented.

Figure 15:
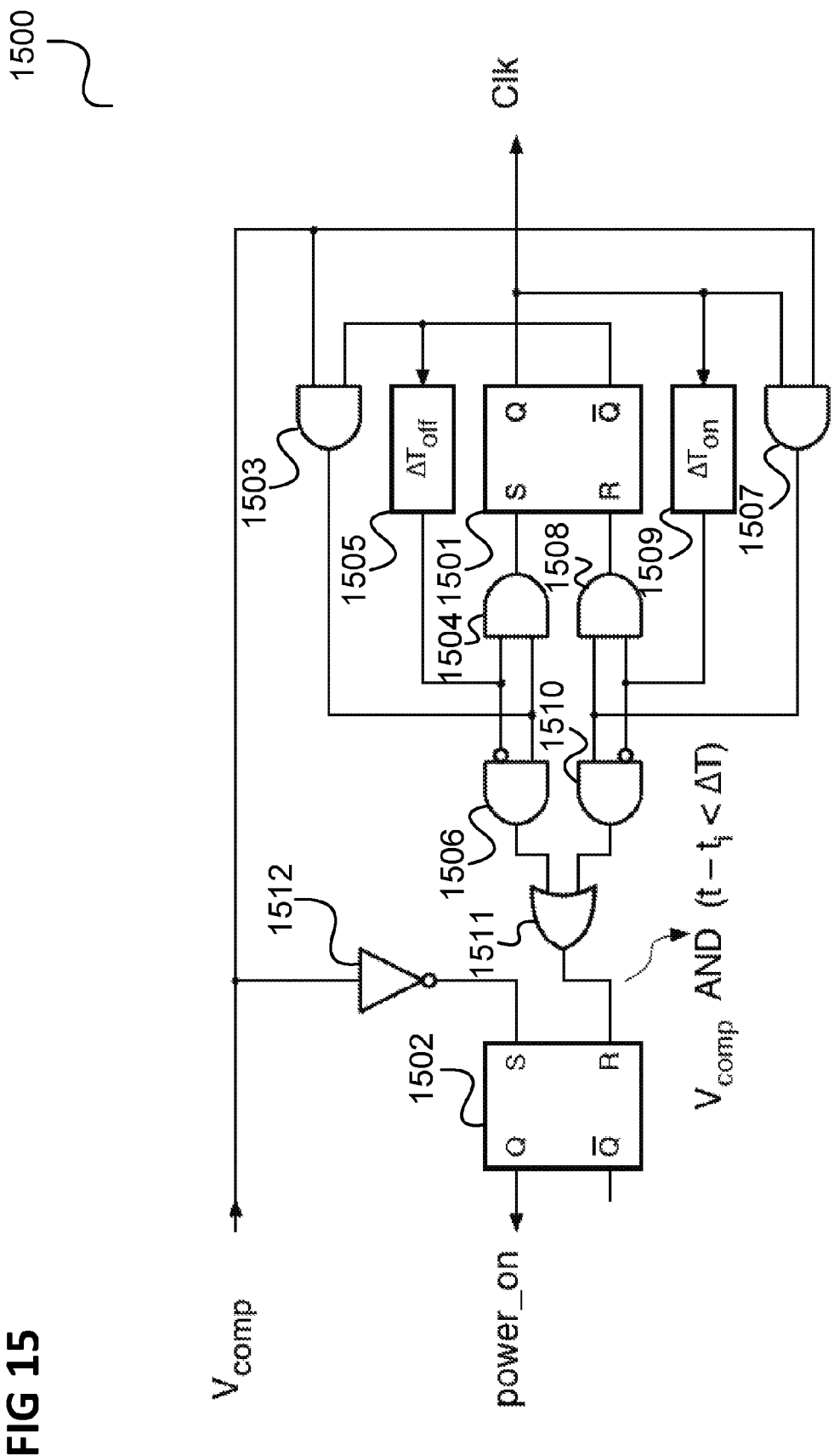
FIG. 15 shows a further example of an implementation of a clock generation circuit.

An implementation where both the clock edges are controlled and the signal power_on is output is shown in FIG. 15.

FIG. 15 shows a clock generation circuit 1500.

The clock generation circuit 1500 can for example be used as the clock generator 1107.

The clock generation circuit 1500 includes a first SR FF 1501 and a second SR FF 1502. The second SR FF 1502 generates the power_on signal which may be used to control the serial power supply switch 1104 of the electronic circuit 1100.

The clock generation circuit 1500 further includes a first AND gate 1503 which receives the signal $V_{comp}$ and the $\overline{Q}$ output signal of the first SR FF 1501. The output of the first AND gate 1504 is fed to a second AND gate 1504 along with the output of a first delay element 1505 which delays the $\overline{Q}$ output signal of the first SR FF 1501 by a clock off time $\Delta T_{off}$. The output of the second AND gate 1504 is connected to the S input of the first SR FF 1501. The delayed $\overline{Q}$ output signal of the first SR FF 1501 is further fed to an inverted input of a third AND gate 1506 which also receives the output of the first AND gate 1503 as input.

The clock generation circuit 1500 further includes a fourth AND gate 1507 which receives the signal $V_{comp}$ and the Q output signal of the first SR FF 1501. The output of the fourth AND gate 1507 is fed to a fifth AND gate 1508 along with the output of a second delay element 1509 which delays the Q output signal of the first SR FF 1501 by a clock on time $\Delta T_{on}$. The output of the fifth AND gate 1508 is connected to the R input of the first SR FF 1501. The delayed Q output signal of the first SR FF 1501 is further fed to an inverted input of a sixth AND gate 1510 which also receives the output of the fourth AND gate 1507 as input.

The Q output of the first SR FF 1501 forms the clock signal generated by the clock generation circuit 1500.

The output of the third AND gate 1506 and the output of the sixth AND gate 1509 from the inputs of an OR gate 1511 whose output is connected to the R input of the second SR FF 1502. An inverter 1512 inverts $V_{comp}$ and supplies the inverted $V_{comp}$ to the S input of the second SR FF 1502.

The Q output of the second SR FF 1502 is the power_on signal.

Depending on the implementation and on the operating conditions, the output of the comparator comparing $V_{pwr}$ and $V_{ref}$ could switch too slowly or could oscillate while $V_{pwr}$ approaches $V_{ref}$. As a result, for example, the SR FFs as shown in FIGS. 12 and 13 could be driven in a metastability status and then, in turn, generate glitches or oscillations. It should be noted that this is not a synchronization issue but an arbitration issue that is implicit in the usage of a comparator whenever the input of the comparator is slow and/or noisy.

Figure 16:
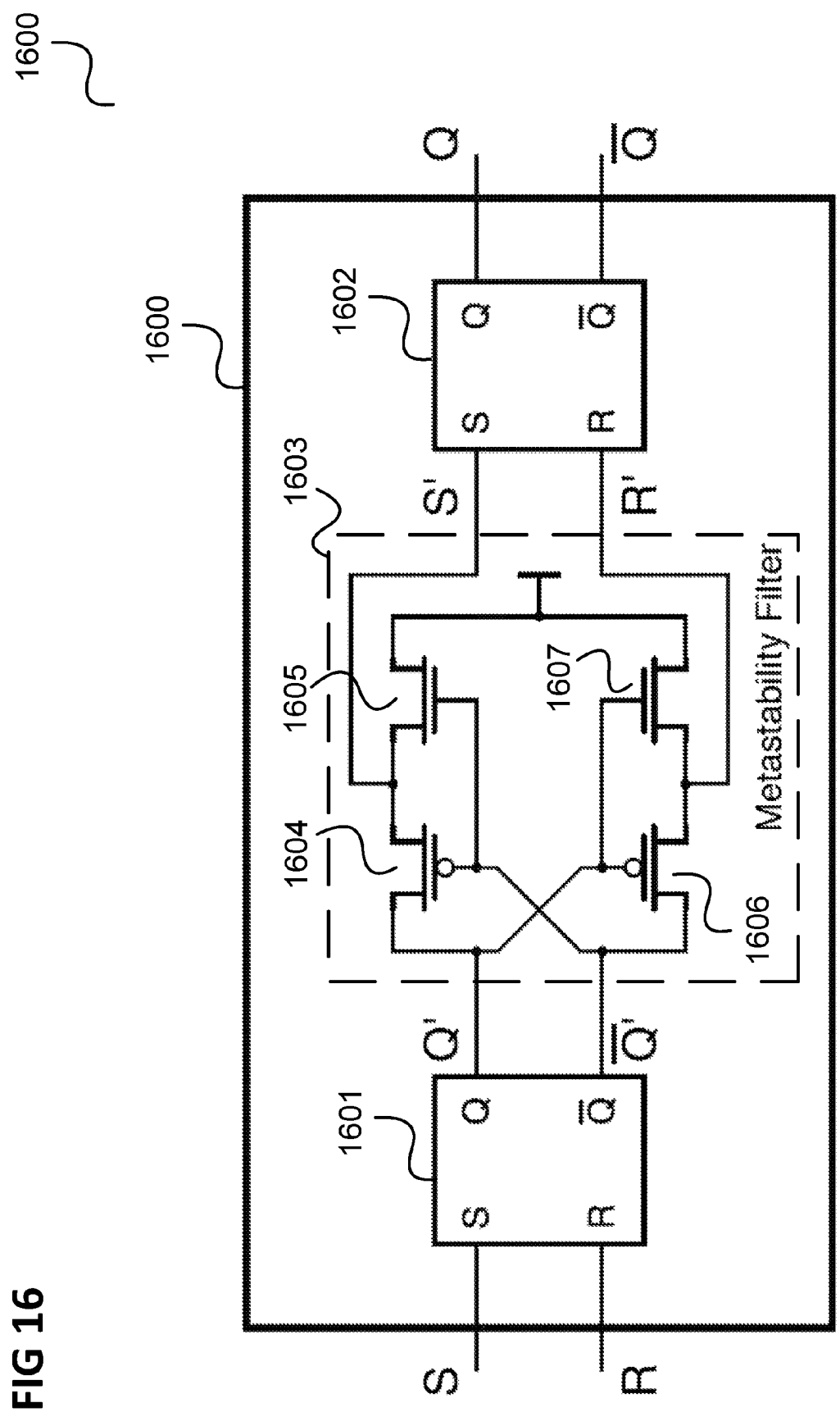
FIG. 16 shows an electronic circuit having a metastability filter.

This issue can be addressed by using a composite SR FF as shown in FIG. 16.

FIG. 16 shows an electronic circuit 1600.

The electronic circuit 1600 may be used as any of the SR FFs of FIGS. 14 and 15.

The electronic circuit 1600 includes a first SR FF 1601 and a second SRFF 1602 which are cascaded through a metastability filter 1603 which prevents metastability of the first SR FF 1601 to propagate to the second SR FF 1602. Basically, the first SR FF 1601 and the metastability filter 1603 can be seen to implement a MUTEX (Mutual Exclusive element).

The metastability filter 1603 includes a first p channel field effect transistor (FET) 1604 whose gate terminal is connected to the $\overline{Q}$ output of the first SR FF 1601 and whose source terminal is connected to the Q output of the first SR FF 1601. The drain terminal of the first p channel FET 1604 is connected to the drain terminal of a first n channel FET 1605 whose source is connected to ground and whose gate terminal is connected to the $\overline{Q}$ output of the first SR FF 1601. The drain terminals of the first p channel FET 1604 and the first n channel FET 1605 are further connected to S input of the second SR FF 1602.

The metastability filter 1603 further includes a second p channel FET 1606 whose gate terminal is connected to the Q output of the first SR FF 1601 and whose source terminal is connected to the $\overline{Q}$ output of the first SR FF 1601. The drain terminal of the second p channel FET 1606 is connected to the drain terminal of a second n channel FET 1607 whose source is connected to ground and whose gate terminal is connected to the Q output of the first SR FF 1601. The drain terminals of the second p channel FET 1606 and the second n channel FET 1607 are further connected to R input of the second SR FF 1602.

Figure 17:
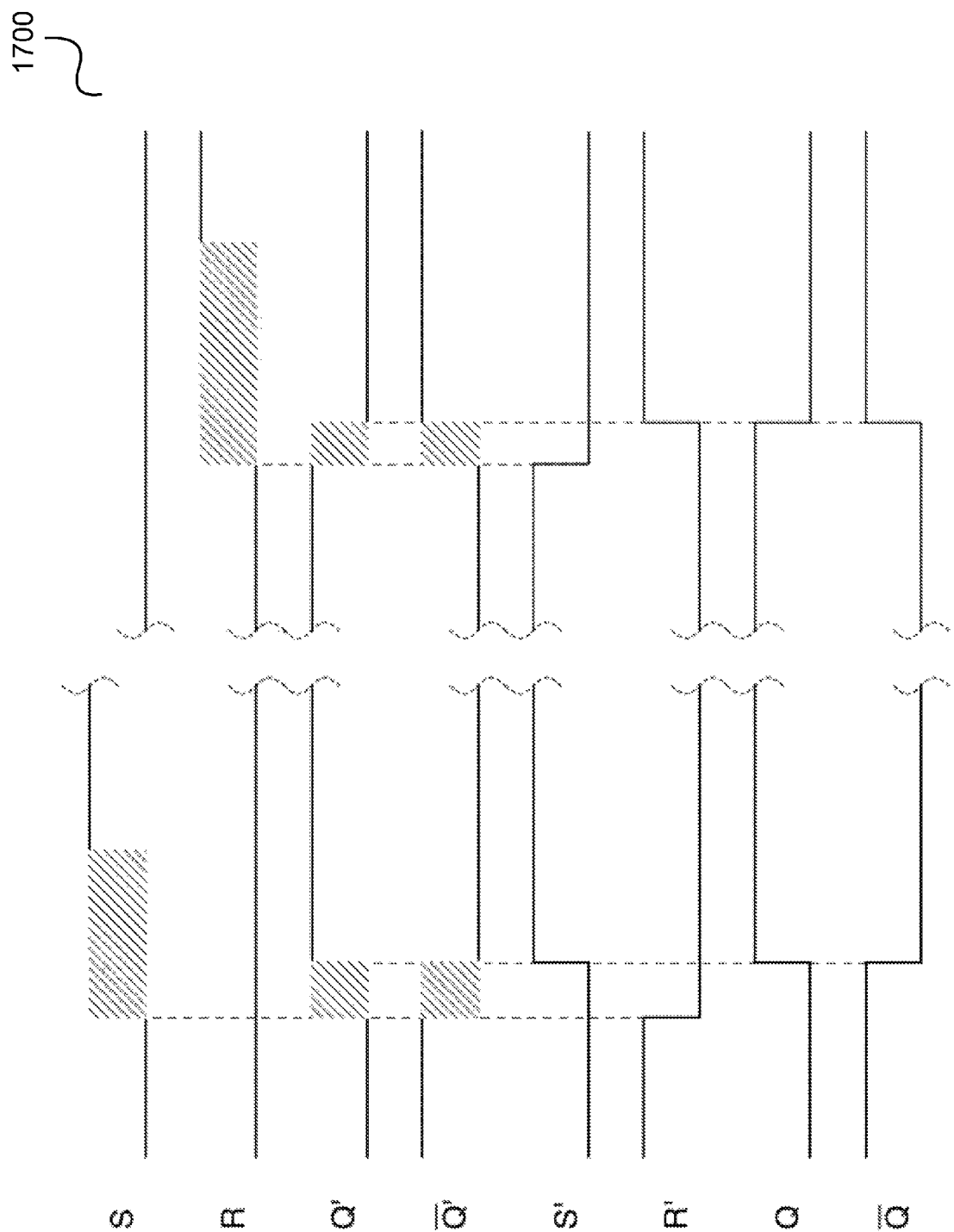
FIG. 17 shows a signal diagram illustrating the behavior of the electronic circuit of FIG. 16.

The operation of the electronic circuit 1600 is shown in FIG. 17.

FIG. 17 shows a signal diagram 1700.

The signal diagram 1700 shows the behavior of the signals S, R, Q', $\overline{Q}'$, S', R', Q and $\overline{Q}$ as indicated in FIG. 16 wherein time flows from left to right.

It can be seen that the electronic circuit 1600, with respect to its inputs S, R and its outputs Q and $\overline{Q}$ operates as a SR FF, but the unstable or metastable inputs (represented as hatched areas) are filtered out.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. An electronic circuit comprising:
   a processing circuit;
   a power supply configured to supply power to the processing circuit via two supply nodes;
   a determiner configured to determine whether the voltage between the two supply nodes is above a predetermined reference voltage; and
   a clock generator configured to generate a clock signal for the processing circuit wherein the clock generator is configured to
      generate clock edges at time points given by a predetermined periodicity when the determiner determines that the voltage between the two supply nodes is above a predetermined reference voltage;
      pause the generation of clock edges when the determiner determines that the voltage between the two supply nodes is not above the predetermined reference voltage; and
      generate a clock edge irrespective of whether it is currently a time point given by the predetermined periodicity when the determiner determines that the voltage between the two supply nodes is again, after pausing the generation of clock edges, above the predetermined threshold.

2. The electronic circuit of claim 1, wherein the clock generator is configured to generate further clock edges after the generated clock edge according to the predetermined periodicity.

3. The electronic circuit of claim 1, further comprising a switch configured to connect the power supply to the processing circuit if the voltage between the two supply nodes is below the reference voltage.

4. The electronic circuit of claim 1, further comprising a switch configured to disconnect the power supply from the processing circuit if the voltage between the two supply nodes is above the reference voltage and no clock edge is to be generated according to the predetermined periodicity.

5. The electronic circuit of claim 1, wherein the predetermined periodicity is given by a predetermined minimum time between two clock edges.

6. The electronic circuit of claim 5, wherein the clock generator is configured to generate the clock edge if at least the predetermined minimum time since the last clock edge has passed.

7. The electronic circuit of claim 1, wherein the processing circuit is a digital processing circuit.

8. The electronic circuit of claim 1, further comprising a shunt connected between the two supply nodes configured to limit the voltage between the two supply nodes to a predetermined clipping voltage.

9. The electronic circuit of claim 1, comprising a comparator configured to compare the voltage between the supply nodes with the reference voltage and to provide a comparison signal indicating the result of the comparison at an output of the comparator.

10. The electronic circuit of claim 9, wherein the clock generator comprises a storage element storing the current clock state and having a control input connected to the output of the comparator.

11. The electronic circuit of claim 10, wherein the control input is connected to the output of the comparator such that the comparison signal may trigger a state transition of the storage element.

12. The electronic circuit of claim 10, wherein the storage element is configured to provide the current clock state at an output and the generated clock signal is the signal as provided at the output.

13. The electronic circuit of claim 10, wherein the storage element is a Flip Flop.

14. The electronic circuit of claim 10, wherein the storage element is a Set-Reset-Flip Flop.

15. The electronic circuit of claim 1, wherein the power supply is a current source.

16. A method for providing a clock signal to a processing circuit comprising:
   determining whether the voltage between two supply nodes via which a power supply supplies power to the processing circuit is above a predetermined reference voltage;
   generating clock edges at time points given by a predetermined periodicity if the voltage between the two supply nodes is above a predetermined reference voltage;
   pausing the generation of clock edges if the voltage between the two supply nodes is not above the predetermined reference voltage; and
   generating a clock edge irrespective of whether it is currently a time point given by the predetermined periodicity if the voltage between the two supply nodes is again, after pausing the generation of clock edges, above the predetermined threshold.

* * * * *